(No Model.)
C. DRONNE.
WEEDING TOOL.
No. 317,523. Patented May 12, 1885.
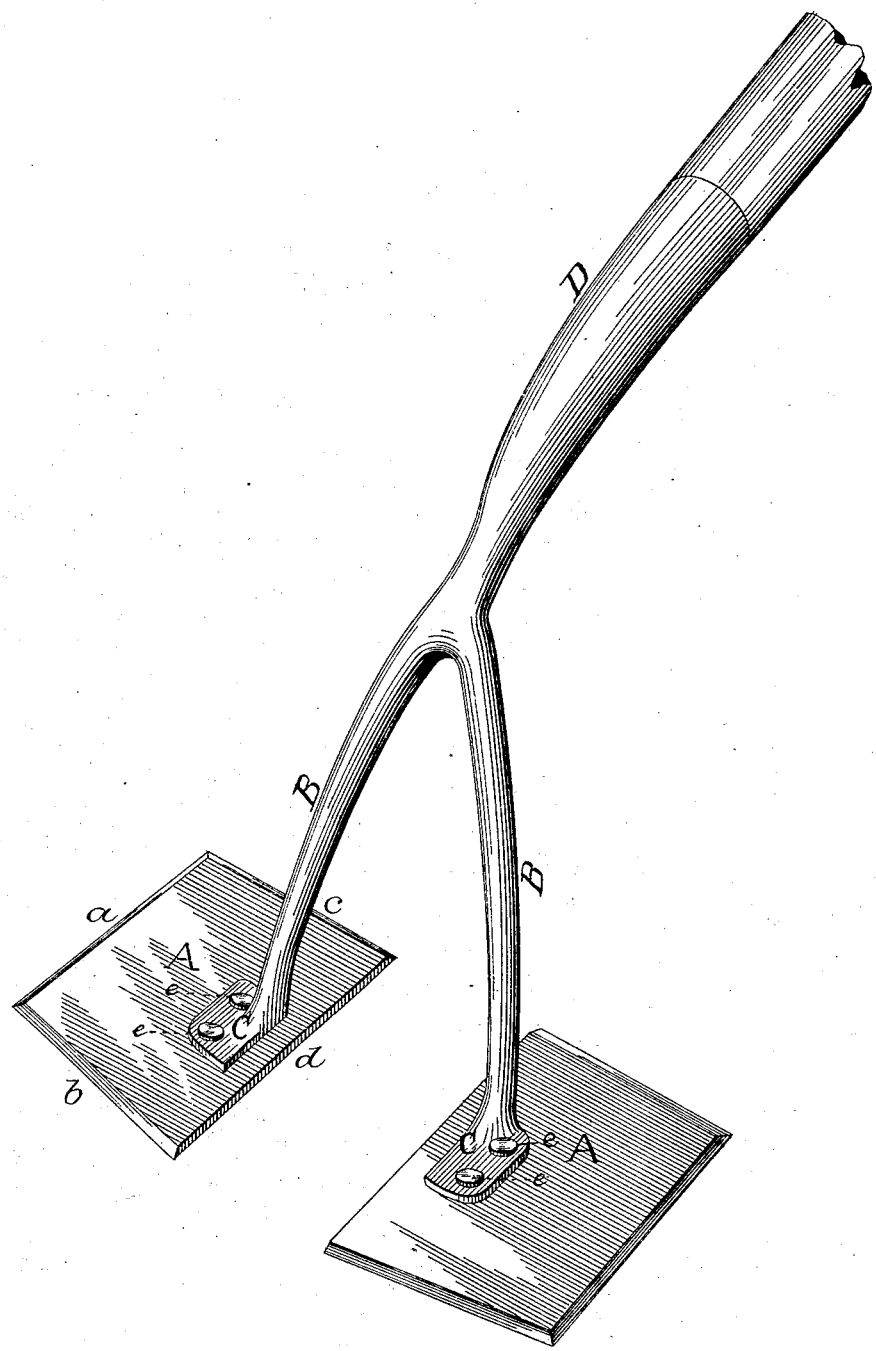

United States Patent Office.

CONSTANT DRONNE, OF PORT RICHMOND, NEW YORK.

WEEDING-TOOL.

SPECIFICATION forming part of Letters Patent No. 317,523, dated May 12, 1885.

Application filed September 22, 1884. (No model.)

*To all whom it may concern:*

Be it known that I, CONSTANT DRONNE, who have declared my intention to become a citizen of the United States, and who have resided therein for one year, and residing at Port Richmond, county of Richmond, and State of New York, but at the date hereof still a citizen of France, have invented a new and useful Improvement in Weeding-Tools, of which the following is a specification.

My invention has for its object the improvement of weeding-tools, so as to make them simpler and less complicated in their construction and more effective in their operation, enabling the operator to do the work of weeding thoroughly and quickly and without injuring or interfering with the roots of the plants or removing the soil from the same, and to work forward as well as backward and sidewise, and to weed on both sides of the rows.

The invention is illustrated in the accompanying drawing in a single perspective view, in which—

A A represent two polished steel plates, shaped like a parallelogram with the front side sheared off, as shown in the drawing filed with this application. The sides of the plates *a b c* have sharpened beveled edges, except the inner sides, *d*, which have square edges.

A two-pronged fork is formed of malleable iron, each prong or shank B B terminating in a head or plate, C C, of the same metal, and of one piece with the prongs or shanks, the said heads or plates C C forming any desired angle with the shanks. The said heads or plates of the shanks are firmly riveted to the steel plates A A, first above mentioned, by rivets *e e*. The two prongs or shanks meet together at the other end and form and terminate in a socket, D, into which a wooden handle is inserted for the purpose of operating the tool.

I am well aware that double-bladed weeding-tools or scuffle-hoes which have the blades or steel cutting-plates attached or fastened to adjustable prongs or shanks have been heretofore patented and to some extent used; but the same have been found impracticable and of little value, the raised edge on the sides of the plate choking the tool with earth and grass and preventing its continued use without incessant cleaning, while the adjustability of the shanks causes the same to soon become loose and unserviceable.

I am aware of Patent No. 131,627, but do not claim the construction therein shown.

Having thus described my invention, I claim as new and desire to secure by Letters Patent—

In a double-bladed weeding-tool or scuffle-hoe, the combination, with a bifurcated shank, of flat plates rigidly secured in one plane to the end of the same, said plates constituting the cutting-blades of the tool and having cutting-edges formed on their three outer edges, their adjacent inner edges being plain, square, and smooth, substantially as and for the purposes hereinbefore described.

In testimony that I claim the foregoing as my invention I have signed my name, in presence of two witnesses, this 6th day of August, 1884.

CONSTANT DRONNE.

Witnesses:
　JOE W. HYDE,
　A. HOUSMAN.